US006519130B1

(12) United States Patent
Breslow

(10) Patent No.: US 6,519,130 B1
(45) Date of Patent: Feb. 11, 2003

(54) LID OPENER MECHANISM

(76) Inventor: Donald Breslow, 6 Blueberry Cir., Framingham, NH (US) 01741

(*) Notice: Subject to any disclaimer, the term of this patent is extended or adjusted under 35 U.S.C. 154(b) by 210 days.

(21) Appl. No.: 09/685,155

(22) Filed: Oct. 10, 2000

Related U.S. Application Data

(60) Provisional application No. 60/158,286, filed on Oct. 7, 1999.

(51) Int. Cl.[7] ........................ H01H 47/28; E05F 15/20; G05B 5/00

(52) U.S. Cl. ........................ 361/170; 318/480

(58) Field of Search ........................ 361/170, 171, 361/172; 318/480, 285, 283, 568.1; 220/211, 260, 335, 521, 263, 909, 780, 910; 49/30, 58, 506, 507, 25, 31

(56) References Cited

U.S. PATENT DOCUMENTS

| | | | | | |
|---|---|---|---|---|---|
| 3,886,425 | A | * | 5/1975 | Weiss | 318/468 |
| 4,729,490 | A | * | 3/1988 | Ziegenbein | 220/211 |
| 4,996,467 | A | * | 2/1991 | Day | 318/480 |
| 5,932,982 | A | * | 8/1999 | Pezzelli, Jr. | 318/480 |
| 6,150,939 | A | * | 11/2000 | Lin | 340/568.1 |

* cited by examiner

*Primary Examiner*—Rajnikant B. Patel
(74) *Attorney, Agent, or Firm*—Dilworth & Barrese, LLP

(57) ABSTRACT

A lid opening mechanism includes an enclosure with at least one wall having an inner periphery which defines a bay. A lid is attached to the enclosure and is moveable between an open position and a closed position relative to the bay. A sensor activates a solenoid switch which opens the lid in response to the detection of an object within the bay. A control circuit selectively regulates the amount of electrical current to the solenoid switch.

10 Claims, 9 Drawing Sheets

LID OPENER MECHANISM

This application claims the benefits of and priority to U.S. Provisional patent application Ser. No. 60/158,286 entitled "LID OPENER MECHANISM" filed on Oct. 7, 1999 by Donald Breslow, the entire contents of each of which is hereby incorporated by reference.

BACKGROUND OF THE INVENTION

1. Field of the Invention

This invention relates to trash enclosures and more particularly to trash enclosures having a lid opening mechanism which includes a solenoid switch and a control circuit.

2. Previous Art

Trash enclosures may hold trash of all types. Trash may include household garbage, restaurant garbage, medical waste, chemical waste, and other industrial waste. Enclosures may partially or fully enclose trash depending on the type of trash to be enclosed. Trash enclosures often have lids which open to receive trash and close to contain odor, hide trash from view and prevent the trash from contaminating areas beyond the enclosure.

Lids are often opened by hand. Hand opened lids have several problems. In some cases, contact between a hand and the lid may spread contamination. Additionally, sometimes a free hand may not be available to open the lid.

Medical workers and food handlers, for example, may not wish to contact trash containers to avoid biological contamination. Similarly, chemical workers may not wish to contact a container such as a trash enclosure which holds chemical contaminants. Contact with any potentially contaminated container is undesirable.

In fast food restaurants, food is often served on trays. Upon finishing a meal, the trays are carried to a trash container where the trash is dumped and the tray deposited. Fast food wrappers and other waste may fly off of the tray when being dumped into the container. Two hands may be necessary to carry and dump such a tray without spilling the waste. It can be appreciated that a free hand is not always available for opening the lid and waste may spill as a result. In particular, trash may spill if the lid is not properly held open because the lid may push the trash off of the tray. This situation may be observed at many fast food restaurants which have hand operated trash enclosure lids. Such spills are sought to be avoided.

In order to facilitate insertion of trash into a trash enclosure, automatically operable lids have been developed. Such automatically operable lids may be fitted with a sensor system which automatically opens the lid upon demand. Ideally, such enclosures will eliminate the need for pushing the lid open by hand. An example an enclosure having a sensor is described in U.S. Pat. No. 4,981,275 to Sheu, the disclosure of which is incorporated herein by reference.

The Sheu invention relies upon a sensor mounted on the face of the trash enclosure. The sensor detects objects in front of the enclosure and causes the lid to open in response to detection of an object. Accordingly, a passerby may inadvertently activate the sensor and cause the lid to open. Inadvertent opening of the lid may unnecessarily release odor and contaminants from the trash enclosure. Accordingly the lid should not be inadvertently opened.

It is also known that photoelectric eyes may be employed to activate various motors or other mechanisms for opening and closing a lid. Photoelectric eyes tend to rely on visible light. When visible light is relied upon, the sun and other light sources may interfere with the operation of the sensor and, in the present case, may mistakenly or inadvertently activate the lid opening mechanism.

U.S. Pat. No. 5,932,982 which is commonly owned by the Assignee Millennium Technologies, Inc. (MTI) and is hereby incorporated by reference herein, solves inadvertent and unnecessary opening of the lid by mounting the sensor about an inner periphery of a defined bay. When an object enters the defined bay area, the sensor is activated which, in turn, activates the lid opening mechanism. As specifically mentioned in the '982 patent, the motor unit may include a solenoid to open and close the lid which will tend to reduce the overall complexity and cost (e.g., gears motors and drive trains) of the motor unit.

However, it has been found that some solenoids may be unnecessarily noisy and may require complex design considerations to accommodate certain force characteristics required with different door characteristics (i.e., weight, inertia, timing, etc.) and to provide reliable and quiet operation. Thus, there exists a need to develop a simple, quieter, reliable and cost effective lid opening mechanism which solves some of the disadvantages known in prior devices.

SUMMARY OF THE INVENTION

The present disclosure includes a lid opening mechanism having an enclosure with at least one wall having an inner periphery which defines a bay. A lid is attached to the enclosure and is moveable between an open position and a closed position relative to the bay. A sensor activates a solenoid switch which opens the lid in response to the detection of an object within the bay. A control circuit selectively regulates the amount of electrical current to the solenoid switch.

In one embodiment of the present disclosure, the control circuit includes a microprocessor and/or a microcomputer for selectively controlling the amount of electrosurgical current supplied to the solenoid switch. Preferably, the control circuit is selectively programmable to compensate for gravitational and inertia forces acting on the lid.

In another embodiment, the solenoid switch includes a plunger which retracts a control arm to open the lid upon activation of the solenoid switch by the sensor.

In yet another embodiment, the solenoid switch includes an open limit switch and a closed limit switch. The open limit switch is preferably electrically associated with the solenoid switch to delay the electrical current to the solenoid switch for a selectively programmable period of time when the lid is in an open position. The closed limit switch is preferably electrically associated with the solenoid switch to deactivate the solenoid switch when the lid is in the closed position until the solenoid switch is activated by the sensor.

Preferably, the sensor includes an infrared photoelectric eye which generates infrared light and senses reflected infrared light to minimize sensor interference with visible light.

In one embodiment, the control circuit includes a delay which causes the lid to remain open for a predetermined period of time after the sensor activates the lid opening mechanism.

BRIEF DESCRIPTION OF THE DRAWINGS

Other objects and features of the present invention will become apparent from the following detailed description considered in connection with the accompanied drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE INVENTION

Figure 1:
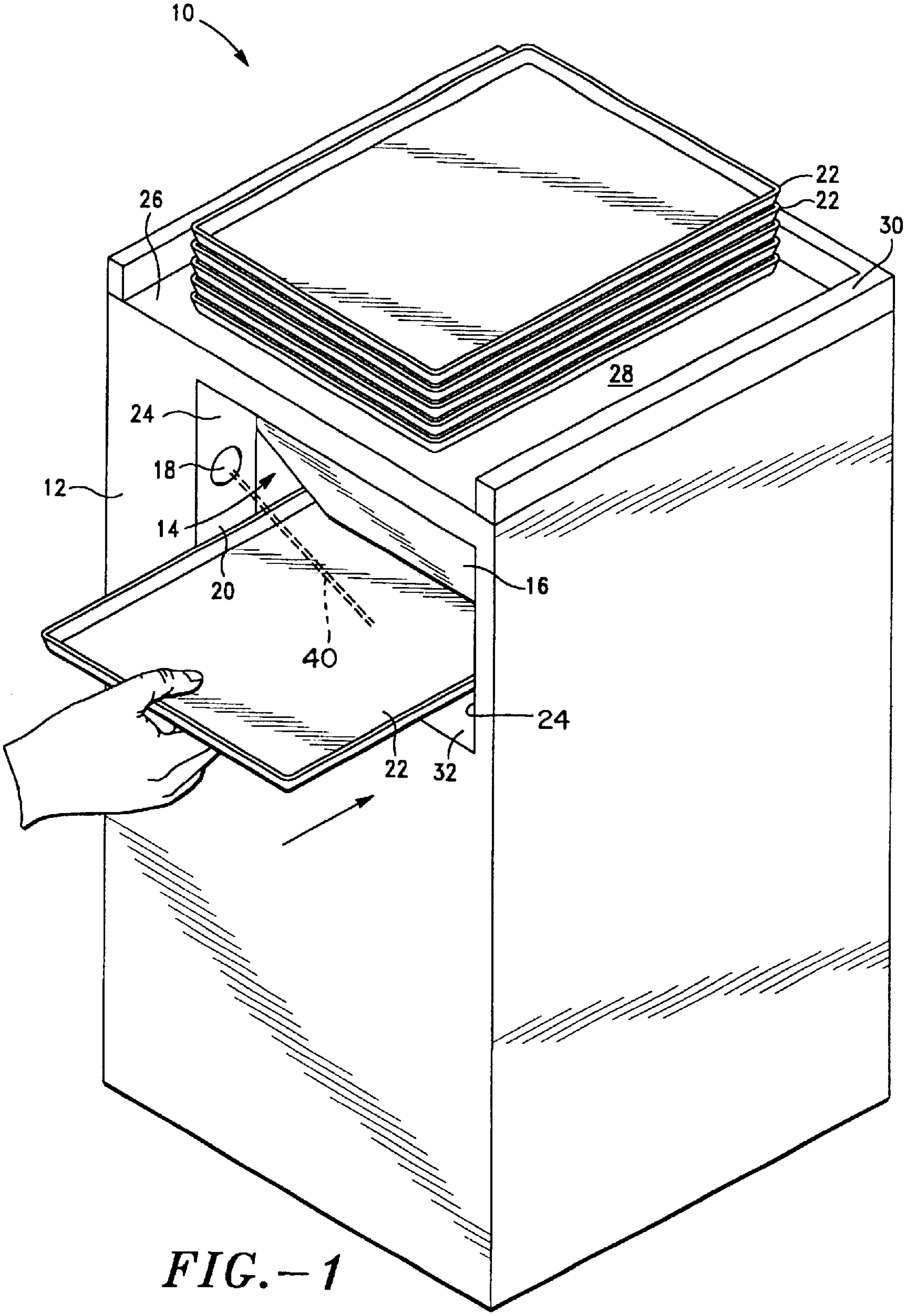
FIG. 1 shows a perspective view of the present invention with a sensor mounted along a side edge of a receiving bay with a tray shown breaking the sensor barrier causing movement of the trash lid.

Turning now to the figure drawings and in particular FIG. 1 which shows a trash enclosure generally designated by reference numeral 10. The trash enclosure 10 comprises a cabinet 12 having a bay 14, a moveable lid 16 and a sensor 18. The lid 16 is shown open, but closes to cover the bay 14. When lid 16 is closed, sensor 18 detects objects within bay 14, e.g., trash, and causes lid 16 to automatically open and receive the trash.

Figure 6:
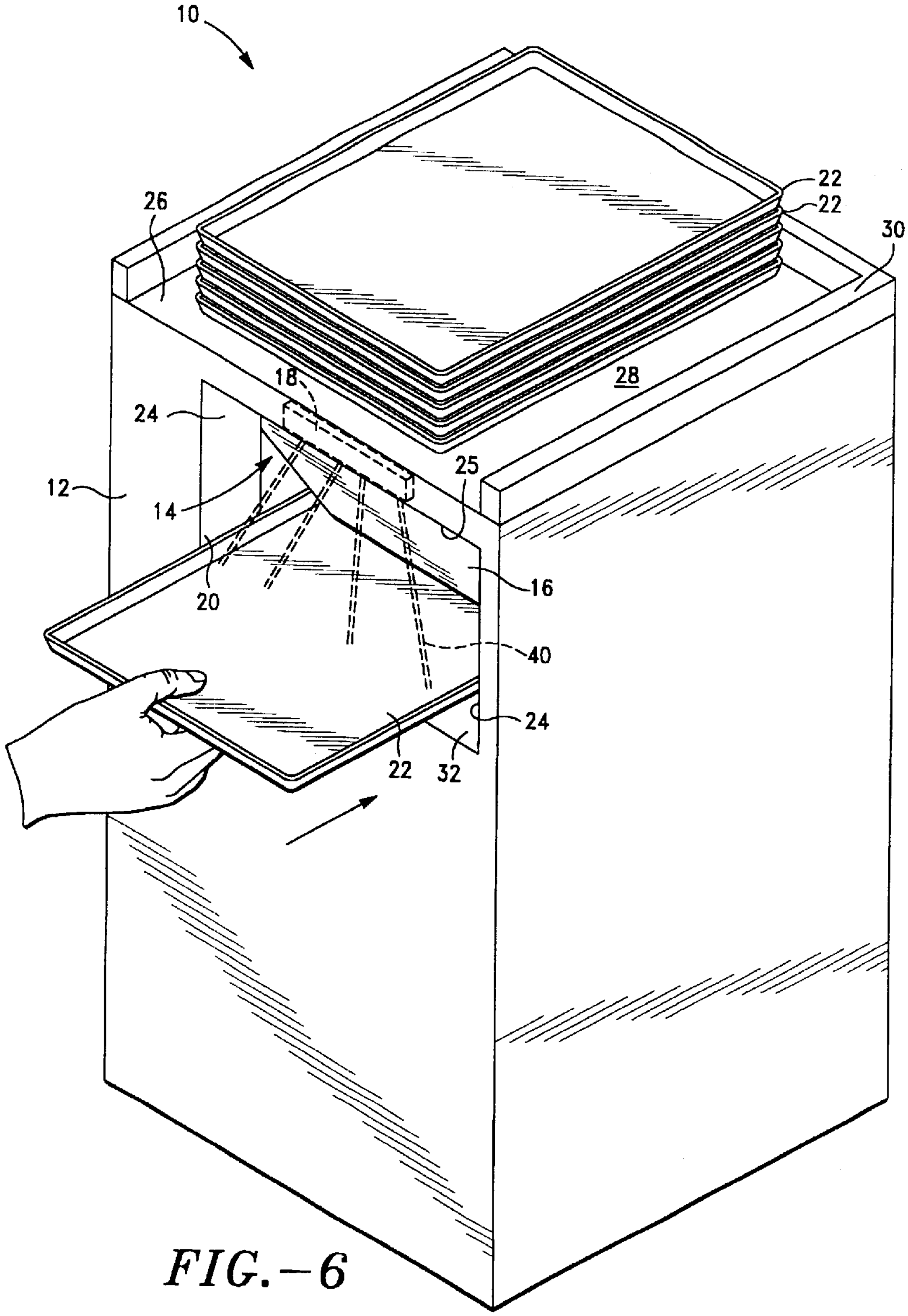
FIG. 6 is a perspective view of another embodiment of the present invention with the sensor mounted on the top edge of the receiving bay.

The enclosure has at least one wall having an inner periphery 20 which defines bay 14. Preferably, the sensor 18 mounts on the inner periphery 20 of bay 14, e.g., along front edge 24 or top edge 25 (See FIG. 6). However, in some cases, it may be preferable to mount sensor 18 on lid 16. As can be appreciated, mounting sensor 18 within bay 14, e.g., along inner periphery 20 inhibits inadvertent detection of objects which are located outside bay 14.

In one particular embodiment, e.g., the embodiment shown in FIG. 1, sensor 18 is recessed from front edge 24 which enables bay 14 to shield sensor 18 from objects which are located beyond the bay 14. In another embodiment, it may be preferable to mount sensor 18 along top edge 25 (or a portion of the same) for manufacturing and/or cosmetic purposes (See FIG. 6).

Preferably, cabinet 12 is formed as a single unit and comprises a top 26 having a flat surface 28 for holding multiple trays 22. Advantageously, top 26 comprises a ridge which cooperates with flat surface 28 to prevent trays 22 from sliding off cabinet 12. Accordingly, when the restaurant patron finishes eating, tray 22 and trash are inserted into bay 14. Sensor 18 detects the trash and tray 22 in bay 14 and automatically opens lid 16 so that a patron may dump the trash into cabinet 12. Thereafter, the now empty tray 22 is removed from bay 14 and stacked on flat surface 28 on top 26 of cabinet 12.

Bay 14 also comprises a bottom ledge 32. As can be appreciated, the provision of bottom ledge 32 will result in consistent positioning of the tray 22 atop the bottom ledge 32 and within bay 14 which, in turn, will enable sensor 18 to consistently and correctly detect objects entering trash enclosure 10.

Figure 2:
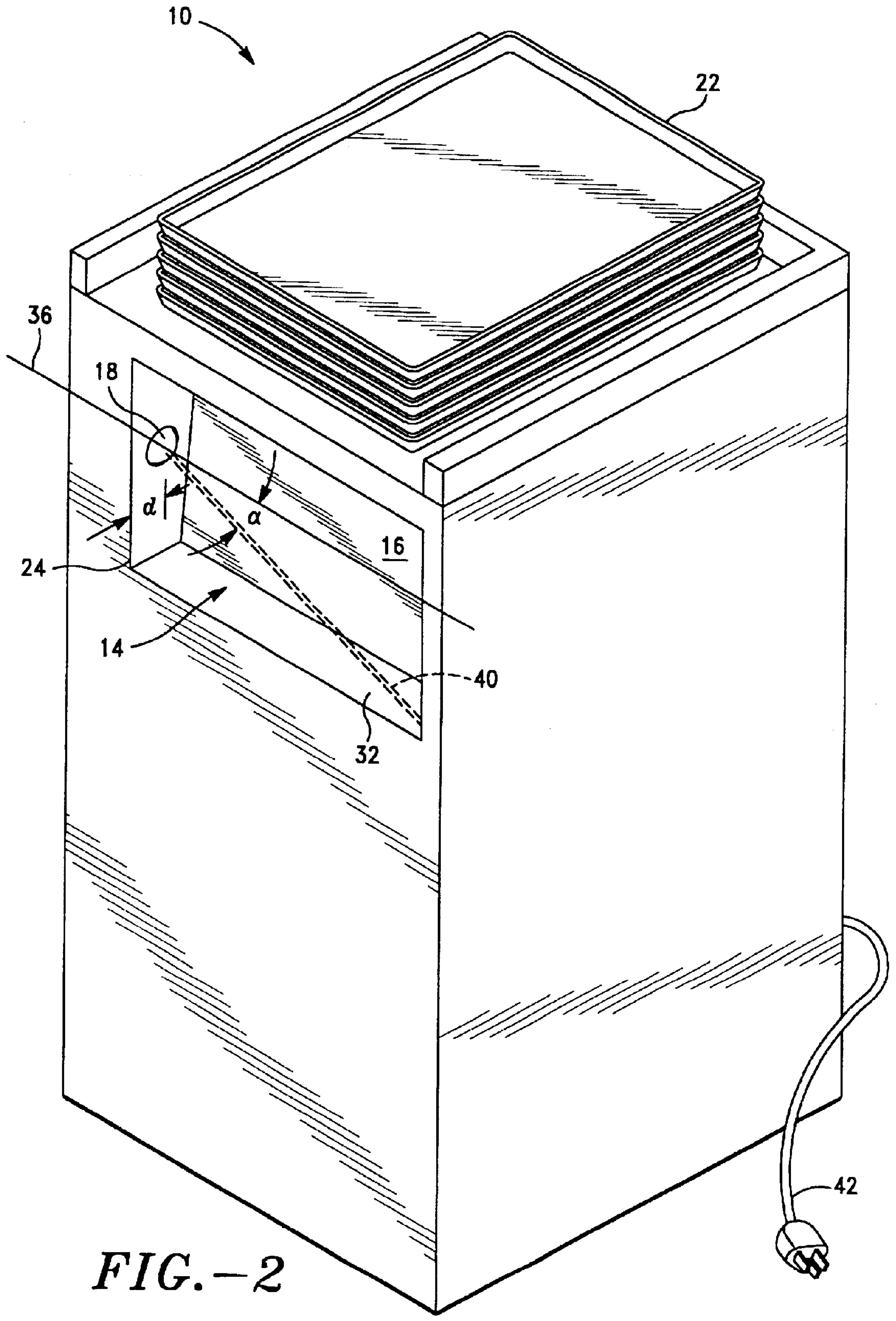
FIG. 2 is a perspective view of the embodiment of FIG. 1 showing the trash lid in closed position and the sensor in an idle or ready state.

FIG. 2 shows sensor 18 directing a stream of infrared spectrum light 40 from sensor 18 across bay 14. More particularly, sensor 18 directs light 40 at an angle $\alpha$ from the horizontal line 36 (See FIG. 2). Preferably, sensor 18 is powered via an A/C power source. A power cord 42 connects sensor 18 to the A/C power source. It can be appreciated, however, that the present invention may be adapted for use with a DC power source or in some instances it may be desirable to use a portable power source, e.g., a battery.

Advantageously, sensor 18 includes an infrared photoelectric sensor which generates infrared light and senses reflected infrared light. Use of an infrared light sensor prevents visible light from interfering with the sensor's 18 operation. In a preferred embodiment, sensor 18 includes an ALLEN BRADLEY diffuse type photoelectric sensor. It can be appreciated, however, that various other sensors 18 may be used in accordance with the present invention including sensors 18 which rely on motion, sound, magnetism and/or various other ways of sensing nearby objects.

In one embodiment, sensor 18 mounts on one side of the bay 14, e.g., along top edge 25 or front edge 24. Preferably, light 40 of sensor 18 is directed towards an opposing side of bay 14 and generally towards bottom ledge 32 at the angle $\alpha$. Advantageously, inner periphery 20 includes a coating of infrared absorptive material to minimize reflection of the infrared light. Preferably, this coating is mat black V-32 laminent.

In one particular embodiment, the angle $\alpha$ is within a range of about 0 degrees to about 55 degrees. In a variation of this embodiment, the angle $\alpha$ is between 10–45 degrees. In another variation of this embodiment, the angle $\alpha$ is within a range of about 20 degrees to about 30 degrees.

Preferably, sensor 18 is recessed a distance "d" from front edge 24 (or the top edge 25). In one embodiment, sensor 18 is recessed from the front edge 24 at a distance within a range of about 0.001 inches to about 6 inches. In another embodiment, sensor 18 is recessed from front edge 24 by a distance within a range of about 0.5 inches to about 4 inches. As can be appreciated, recessing sensor 18 in this manner enables the inner periphery 20 of the bay 14 to shield sensor 18 from sources of infrared light which may be mistakenly detected by sensor 18. Although in this particular embodiment sensor 18 is recessed to prevent unwanted detection, it is not beyond the scope of this invention to provide other ways of shielding sensor 18 to minimize detection of objects beyond the bay 14.

Figure 3:
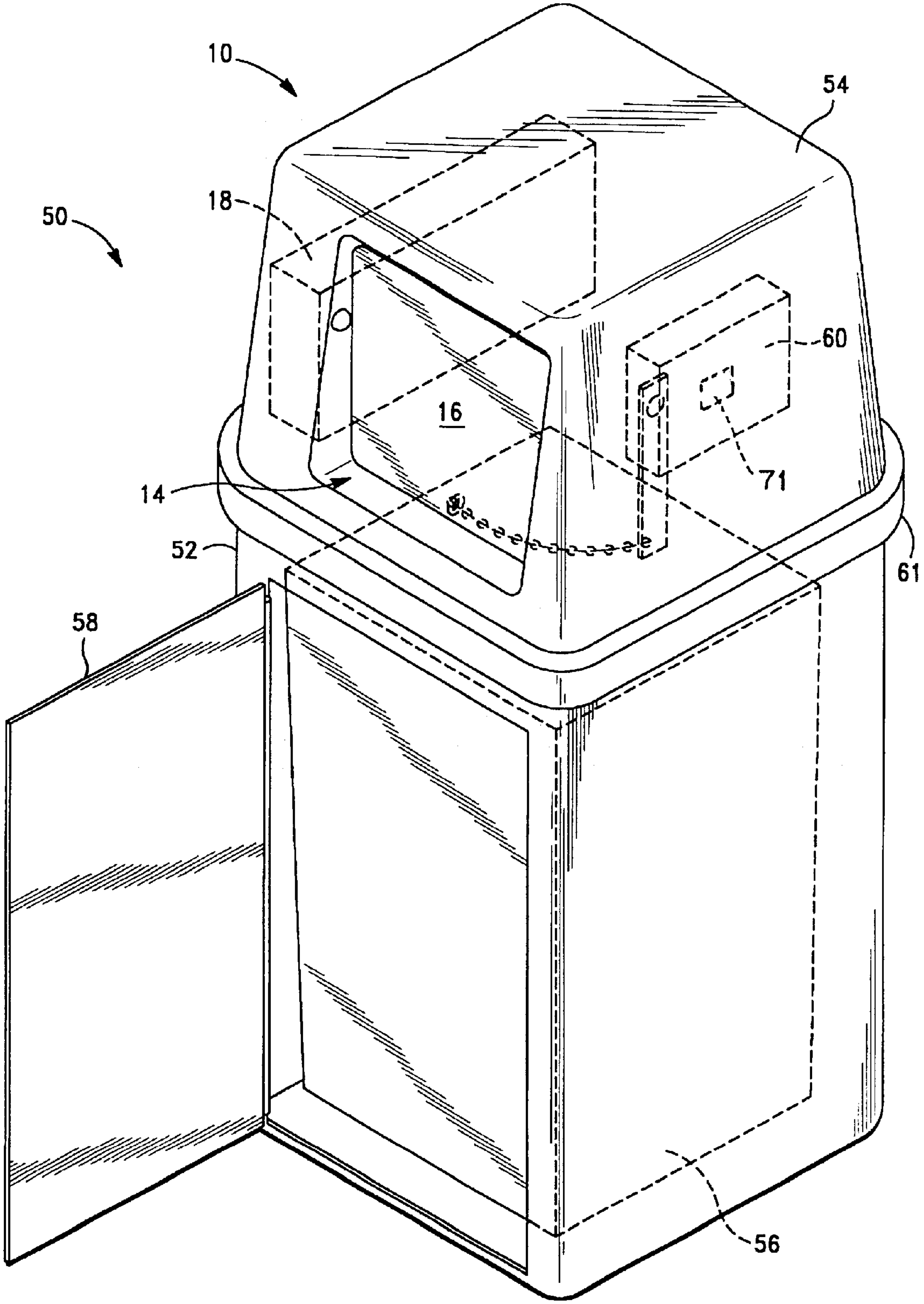
FIG. 3 is a perspective view of the present invention showing an example of the internal positioning of the lid motor and the sensor unit (shown in phantom)

FIG. 3 shows another trash enclosure generally designated with the reference numeral 50. Trash enclosure 50 comprises a cabinet 52, a cover 54, a can 56 and a sensor 18.

Preferably, cover 54 removably attaches to cabinet 52 to enable cleaning and maintenance of the trash enclosure 50. The cover 54 of the enclosure 10 defines a base rim 61 which is mountable on cabinet 52, over the trash can 56. Advantageously, the base rim 61 seals against cabinet 52. As shown in the drawings, cabinet 52 preferably comprises a swinging door 58 to enable removal and replacement of can 56 therefrom, e.g., when can 56 is full. As can be appreciated, when the lid 16 closes, the lid seals against the cover 54 and helps to reduce unwanted odor.

Advantageously, motor unit 60 attaches to cover 54 and cooperates with sensor 18 to enable patron to activate motor 60 and open lid 16 in response to a signal from the sensor 18.

In one embodiment, sensor 18 attaches to cover 54 of trash enclosure 50 to enable existing trash enclosures to be adapted with a cover having a sensor 18 and a motor unit 60. Accordingly, existing trash enclosures may be retrofitted with an automatic lid.

Figure 4:
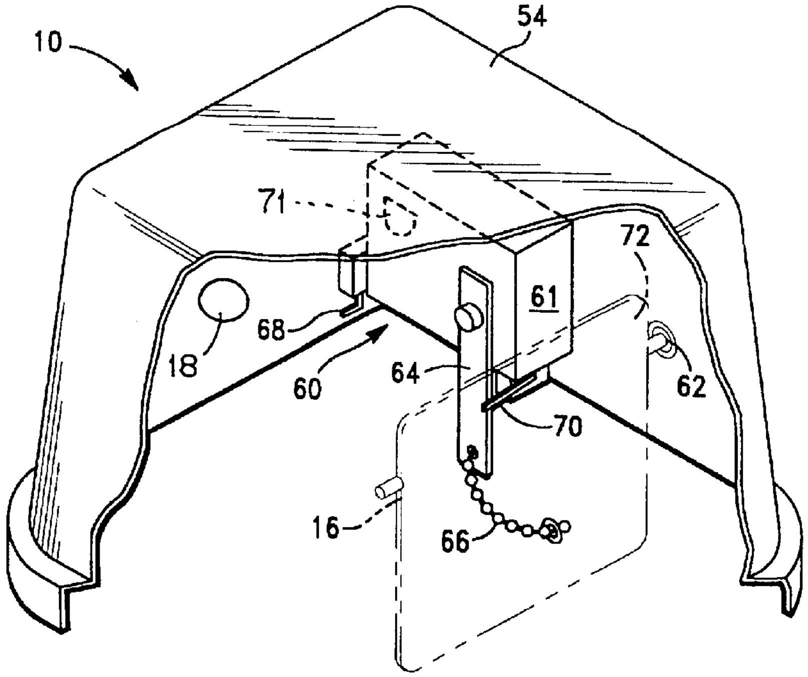
FIG. 4 is a broken perspective view of the trash enclosure showing the motor and the lid door in closed position.

FIG. 4 shows cover 54 and motor unit 60 with a hinge 62 which movably attaches lid 16 to cover 54. Preferably, cover 54 suspends lid 16 in a vertical position to close lid 16, however, lid 16 may be opened by hand and closed by gravity such as when power is not available.

In one embodiment, motor unit 60 includes an electric motor 61, at least one movable arm 64, at least one cable 66, and an open limit switch 68 and a closed limit switch 70. Cable 66 attaches to lid 16 and to movable arm 64 to open lid 16 when motor 61 is activated by sensor 18. In another embodiment, motor unit 60 includes a mechanism 71 which supplies power to motor 60 to open and hold open lid 16 once sensor 18 is activated and cuts off power once sensor 18 returns to its idle or ready state, e.g., a solenoid switch.

Figure 7:
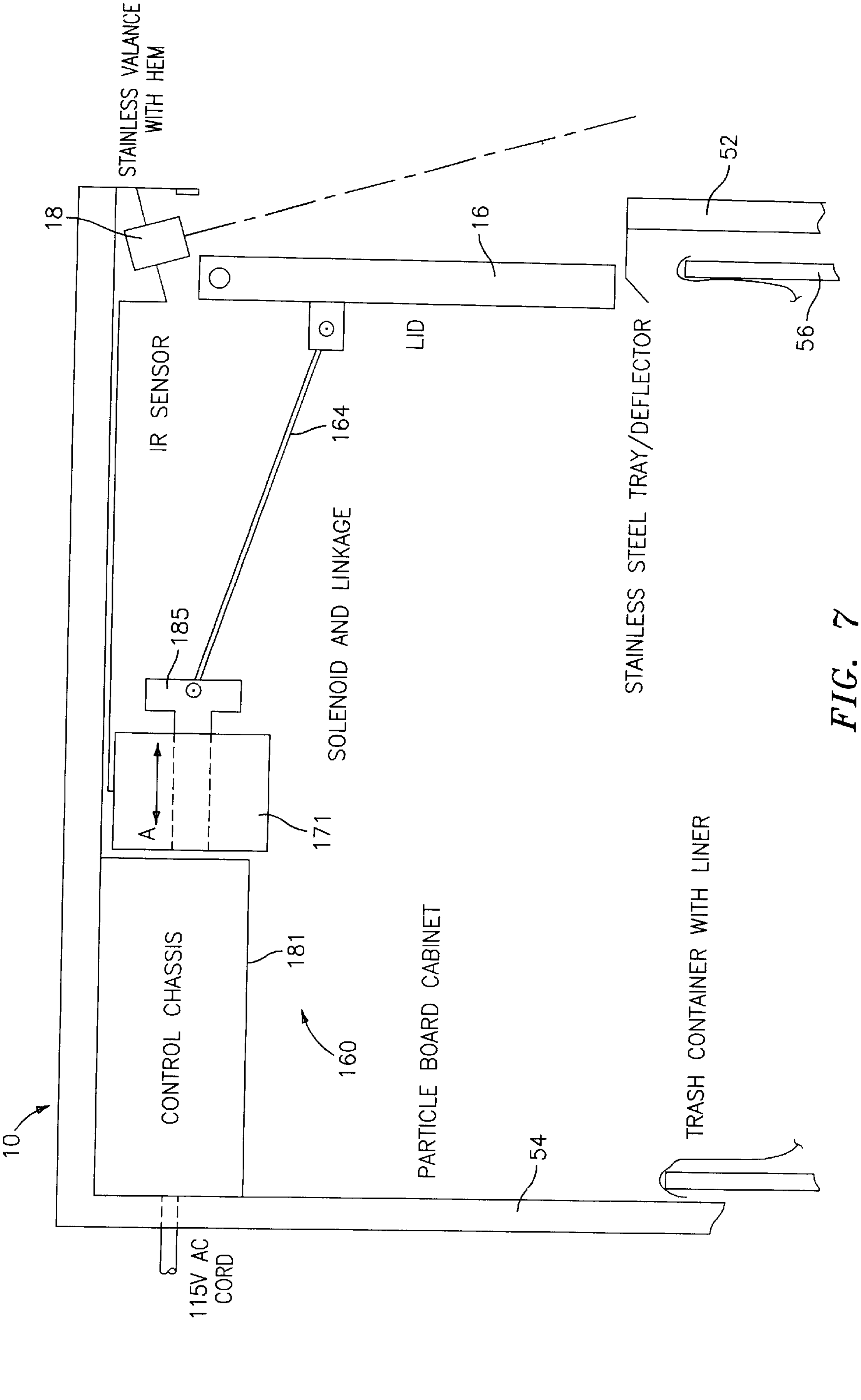
FIG. 7 is a schematic side view of the present invention utilizing a solenoid.

As shown in an alternate embodiment of FIG. 7, a solenoid 171 can be used to open and close the lid 16 which may reduce the overall complexity and cost associated with the aforementioned embodiments which include gears motors and cables 66 to open and close lid 16. For the purposes herein, the term "solenoid" refers to electrically energizable coils made from wire which produce a magnetic field within the coil when electrical current is passed therethrough. A "solenoid switch" includes a coil which surrounds a metal core which moves relative to a coil when the coil is energized.

Figure 8:
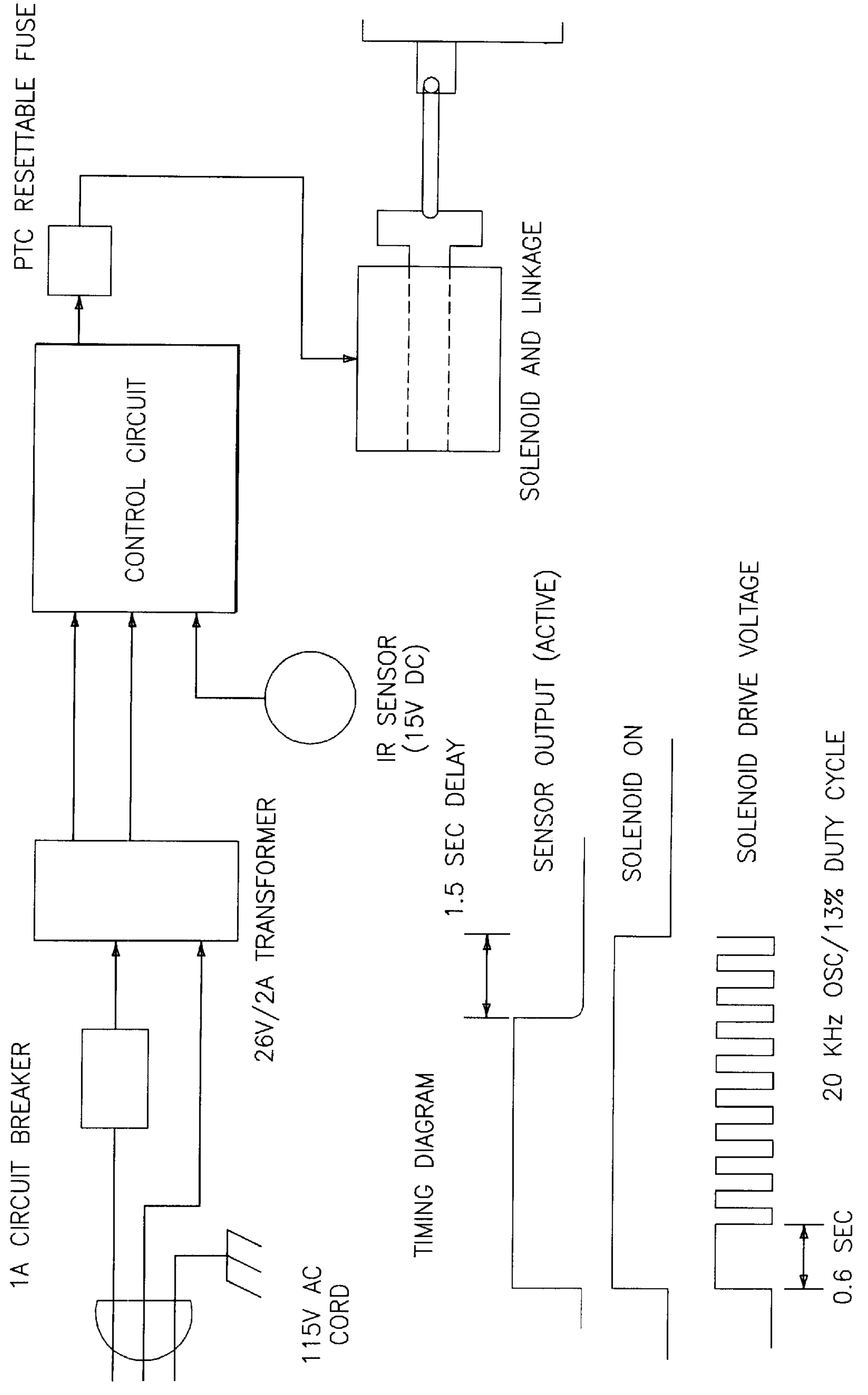
FIG. 8 is a block and timing diagram of a one example of a control circuit according to the present invention.
Figure 9:
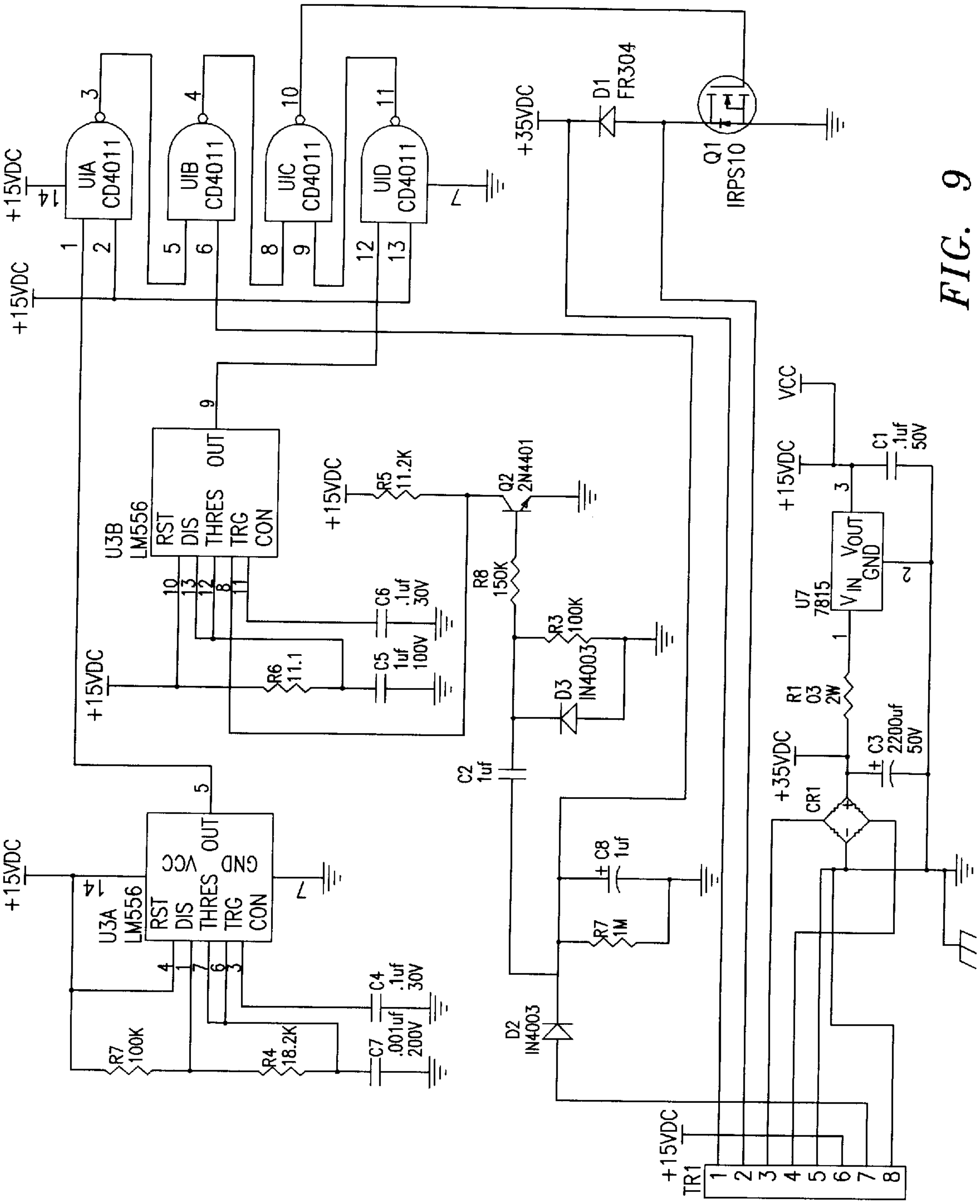
FIG. 9 is a schematic diagram of an example of a control circuit according to the present invention.

In the particular embodiment of FIG. 7, the lid opening mechanism 100 includes solenoid 171 which is activated by the sensor 18, which in turn, moves a control arm 164 to open and close the lid 16. Preferably, a control chassis 181 is included which houses a control circuit 182 (See FIG. 8) to regulate the various characteristics of the solenoid 171 in relation to the overall door dynamics, i.e., opening time, inertia, weight, etc. It is envisioned that the term "control circuit" 182 as used herein includes a circuit which responds to the instructions in a program for a digital computer. As such, the term control circuit may be incorporated to mean circuitry associated with various hardwired devices such as computers, microprocessors, microcomputers, microcontrollers and micro-circuitry and/or logic routines associated with software algorithms and/or in other ways which is customary in the art.

Incorporating a solenoid 171 with control circuitry 182 has proven to be an attractive and cost effective design improvement over the Assignee's commonly owned invention disclosed in U.S. Pat. No. 5,932,982. As can be appreciated, the addition of the control circuitry 182 compensates for some of the more undesirable features of simply using a solenoid 171, i.e., noise and force characteristics, and provides for reliable and quiet operation of the lid opening mechanism 100.

Figure 10A:
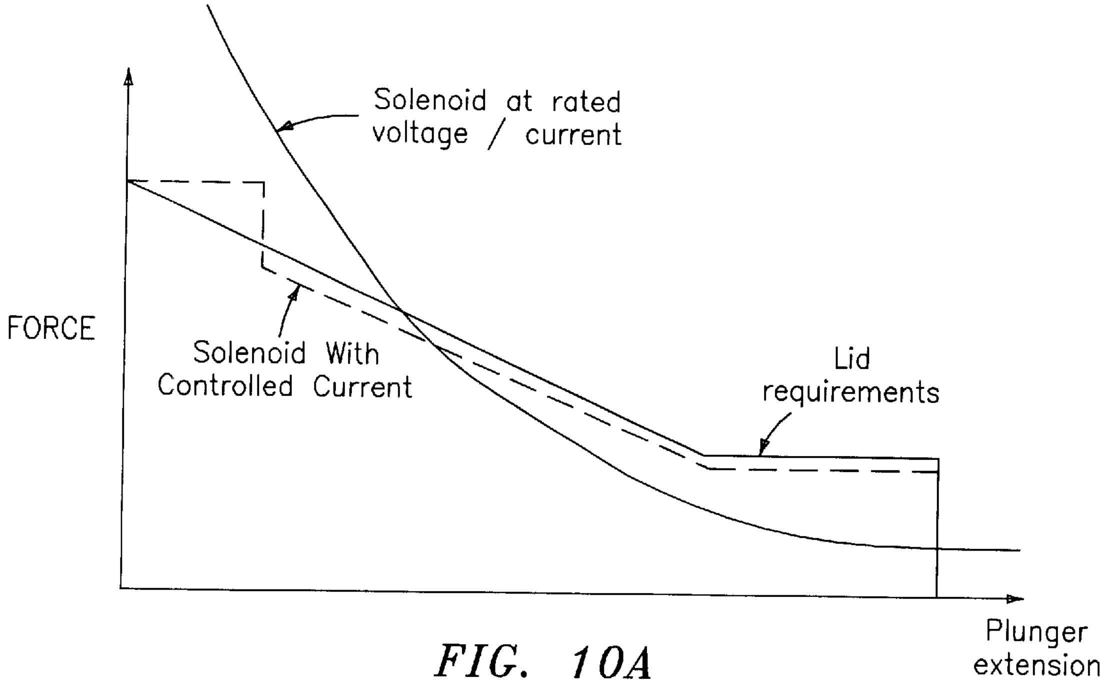
FIG. 10A shows a graph of the force curve of the solenoid in relation to the plunger extension.
Figure 10B:
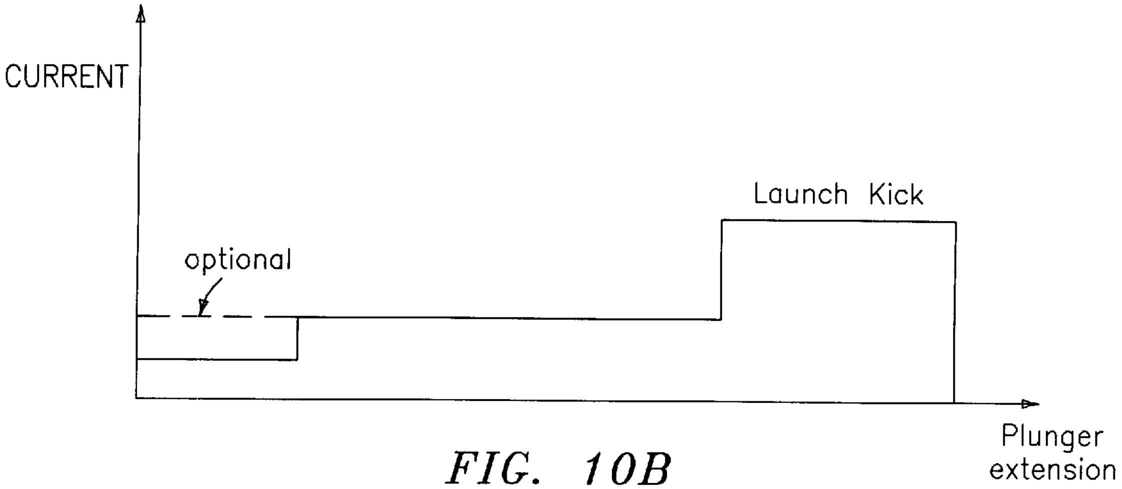
FIG. 10B shows a graph of the current in relation to the plunger extension.

More particularly, it is known that solenoids are attractive from a cost standpoint, but require careful design techniques to accommodate for their force characteristics. For example, FIGS. 10A and 10B shows the solenoid force curve versus plunger extension and current versus plunger extension, respectively. The lid opening mechanism 100 requires a starting kick to accelerate a plunger 185 (See FIG. 7) from rest. As the plunger 185 moves rearwardly along line "A", lid 16 opens. As can be appreciated, the force required to move the plunger 185 rearwardly (i.e., force required to open the lid 16) will increase due to the gravitational forces acting on the lid 16.

The current and, thus, the force associated therewith, must then be reduced to a so called "holding value" so as not to develop excessive force as the plunger 185 seats within the rear of the solenoid 171 which can result in so-called "slamming". More particularly, it is known that a solenoid 171 develops a small force at full extension which rises to a higher force at plunger 185 seating. Even though the rising force is generally in the same direction as the plunger 185 along line "A" during closing, this force is typically not refined.

Control circuitry 182 compensates for these solenoid characteristics and shapes the solenoid forces accordingly which reduces wear and provides for reliable and quiet operation. Preferably, the control circuitry 182 is designed to selectively regulate the current fed to the solenoid 171 to achieve a desired result or depending upon a particular purpose. For example, a high initial pulse or current (See FIG. 10B) retracts the plunger 185 and therefore, the lid 16, when the sensor 18 is activated. After a short period of time, the pulse or current is reduced and the lid 16 tends to "coast" rearwardly with the retraction of the plunger 185 within the solenoid 171. It is envisioned that the solenoid 171 current during "coasting" is less than the current (i.e., force) required to initially retract the lid 16. As can be appreciated, regulating or pulsing the current in this fashion controls the retraction of the lid 16 and reduces so-called "slamming" normally associated with the lid 16 reaching a fully retracted, i.e., fully open, position.

Preferably, the control circuitry 182 is selectively programmable to regulate the initial and coasting pulses or currents to provide consistent and quiet operation of the lid opening mechanism 100. As can be appreciated, factors such as lid 16 weight (e.g., plastic versus stainless steel), inertia, gravitational forces, opening time, etc., may work either alone or in combination to affect the desirable operational currents of the solenoid 171. It is envisioned that the control circuitry 182 may also be easily programmable to take into account these and other operational parameters. For example, rising gravitational forces acting on the lid 16 during opening may factor in providing a brake-like force which will also reduce "slamming" which may need to be carefully adjusted depending upon the weight of the lid 16. In other words, the control circuit 182 may be programmed to match the inertial load to achieve the desired operational dynamics of the lid opening mechanism 100.

Moreover, it is envisioned that the control circuitry 182 may be programmed to provide intermediate currents and/or may continuously regulate the current during the entire opening and/or closing stroke depending upon a particular purpose or to achieve a desired result. This particular technique is particularly effective with AC type solenoid switches 171 which can be quite noisy due to their long stroke lengths, low inductance/impedance and high initial pulse requirements. The aforedescribed control circuitry 182 regulates the current profile to achieve quieter and more reliable operation.

As can be appreciated by the present disclosure, the control circuitry 182 may also regulate the current to provide a specific force to capture and hold the lid 16 against gravitational forces for a preset and/or selectively programmable time limit, i.e., delay the lid 16 from closing.

Figure 5:
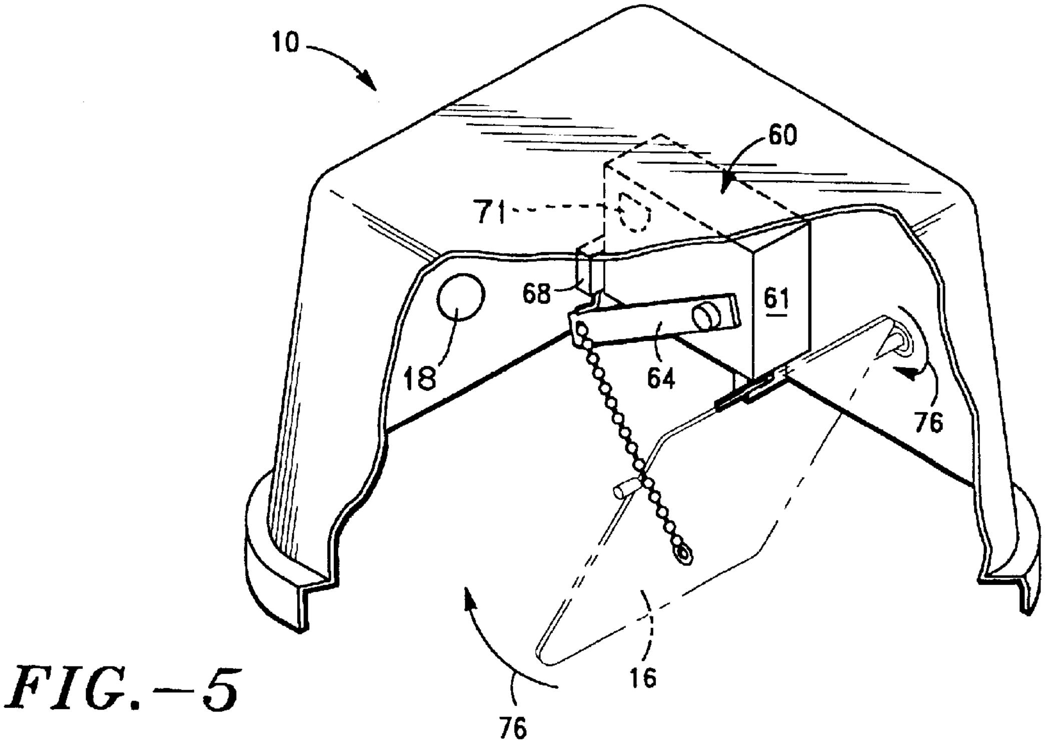
FIG. 5 is a broken perspective view of the trash enclosure showing the movement of the motor arm and the lid door when the sensor is activated.

As best illustrated in embodiment of the lid opening mechanism 100 shown in FIG. 5, arm 64 engages the open limit switch 68 when lid 16 is in the open position and engages the close limit switch 70 when lid 16 is closed. Preferably, limit switches 68 and 70 couple with motor 61 to deactivate the motor 61 and/or solenoid 171 when the lid 16 is in the open position and when the lid 16 is in the closed position. In one embodiment, motor 61 comprises a delay mechanism (as described above) which holds lid 16 open for a predetermined period after activation of open limit switch 68 to enable a user to deposit trash into the trash enclosure 10. Preferably, the predetermined period is within a range of about 1 second to about 15 seconds. Advantageously, lid 16 remains open when an object is in the bay 14 (FIG. 1).

In another embodiment, the sensor 18 may include a delay timer (not shown) which causes the lid 16 to remain open for a predetermined period after the sensor 18 activates motor 61 and/or solenoid 171. The sensor 18 may also include be selectively programmable to adjust the predetermined period as desired.

Preferably, lid 16 has a top portion 72 with at least one hinge 62 which is movable attached to enclosure 10 to suspend lid 16 and to enable lid 16 to rotate between the open and the closed positions. Advantageously, lid 16 is normally suspended in the closed position where the arm 64 contacts the closed limit switch 70 which deactivates the motor.

FIG. 5 shows lid 16 rotated into the open position. Preferably, lid 16 rotates in the direction of the arrows 76. In the open position, arm 64 contacts the open limit switch 68 to deactivate the motor.

While several embodiments of the disclosure has been described herein, it is not intended that the disclosure be limited thereto, as it is intended that the disclosure be as broad in scope as the art will allow and that the specification be read likewise. For example, the motor unit 61 may be replaced by many types of lid opening devices. Sensor 18 may detect and/or be activated in other ways, e.g., with various bands of the electromagnetic spectrum, by magnetism, and/or by sound.

The trash enclosure may assume any of a variety of geometric shapes and may be configured for enclosing numerous types of refuse. The enclosure may fully, or only partially enclose trash. The present invention is useful with any container and it should not be implied that the present invention is solely limited to trash containers. Further, the placement of the sensor 18 can vary. For example, the sensor 18 can be mounted anywhere within bay 14, e.g., in some cases it may be desirable to mount sensor 18 on lid 16.

Therefore, the above description should not be construed as limiting, but merely as exemplifications of a preferred embodiment. Those skilled in the art will envision other modifications within the scope and spirit of the claims appended hereto.

What is claimed:

1. A lid opening mechanism, comprising:

an enclosure having at least one wall having an inner periphery which defines a bay;

a moveable lid attached to the enclosure, the lid being moveable between an open position and a closed position relative to the bay;

a sensor for detecting an object within the bay;

a solenoid switch activatable by an electrical current which opens the lid in response to detection of the object within the bay by the sensor; and a control circuit for selectively regulating the amount of electrical current to the solenoid.

2. A lid opening mechanism as set forth in claim 1, wherein the control circuit includes a microprocessor for selectively controlling the amount of electrical current supplied to the solenoid switch.

3. A lid opening mechanism as set forth in claim 1, wherein the control circuit includes a microcomputer for selectively controlling the amount of electrical current supplied to the solenoid switch.

4. A lid opening mechanism as set forth in claim 1 wherein the control circuit is selectively programmable to compensate for gravitational and inertia forces acting on the lid.

5. A lid opening mechanism as set forth in claim 1, wherein solenoid switch includes a plunger which retracts a control arm to open the lid upon activation of the solenoid switch by the sensor.

6. An apparatus as set forth in claim 1, wherein the solenoid switch includes an open limit switch and a closed limit switch, the open limit switch being electrically associated with the solenoid switch to delay the electrical current to the solenoid switch for a selectively programmable period of time when the lid is in an open position and the closed limit switch being electrically associated with the solenoid switch to deactivate the solenoid switch when the lid is in the closed position until the solenoid switch is activated by the sensor.

7. An apparatus as set forth in claim 1, wherein the sensor includes an infrared photoelectric eye which generates infrared light and senses reflected infrared light to minimize sensor interference with visible light.

8. An apparatus as set forth in claim 1, wherein the inner periphery comprises a coating of infrared absorptive material to minimize reflection of the infrared light.

9. An apparatus as set forth in claim 1, wherein the control circuit includes a delay algorithm which causes the lid to remain open for a predetermined period after the sensor activates the lid opening mechanism.

10. An apparatus as set forth in claim 9, wherein the predetermined period is selectively programmable.

* * * * *